(12) United States Patent
Hofstetter

(10) Patent No.: US 6,224,613 B1
(45) Date of Patent: May 1, 2001

(54) DEVICE FOR REFERENCING A SYSTEM OF COORDINATES

(75) Inventor: Robert Hofstetter, Bern (CH)

(73) Assignee: Synthes (U.S.A.), Paoli, PA (US)

( * ) Notice: Subject to any disclaimer, the term of this patent is extended or adjusted under 35 U.S.C. 154(b) by 0 days.

(21) Appl. No.: 09/562,948

(22) Filed: May 3, 2000

Related U.S. Application Data

(63) Continuation of application No. PCT/CH97/00418, filed on Nov. 4, 1997.

(51) Int. Cl.[7] .................................................. A61B 19/00
(52) U.S. Cl. ............................................................ 606/130
(58) Field of Search ........................... 606/130; 600/424, 600/439, 414, 417, 409; 128/899, 903

(56) References Cited

U.S. PATENT DOCUMENTS

| | | | |
|---|---|---|---|
| 5,197,476 | 3/1993 | Nowacki et al. | 128/660.03 |
| 5,617,857 | 4/1997 | Chader et al. | 128/653.1 |
| 5,792,147 | * 8/1998 | Evans et al. | 606/130 |
| 5,907,395 | * 5/1999 | Schulz et al. | 606/130 |

FOREIGN PATENT DOCUMENTS

| | | | |
|---|---|---|---|
| 2608271 | * 6/1988 | (FR) | . |
| WO 86/06948 | 12/1986 | (WO) | . |

OTHER PUBLICATIONS

English translation of French Patent FR 2608271 A, previously disclosed with English abstract on May 3, 2000.

* cited by examiner

*Primary Examiner*—Pedro Philogene
(74) *Attorney, Agent, or Firm*—Pennie & Edmonds LLP

(57) ABSTRACT

The invention relates to a device for referencing a system of coordinates (1) in space (2). It comprises a body (4) that is suspended in space (2), and which is aligned in a local gravitational field (3). Further, the device has at least two first components (5) that emit electromagnetic or acoustic waves that are located at a distance, A, from each other. Second components (5) for detecting acoustic waves or a magnetic field may also be arranged on the body (4) at a distance, A, from each other, instead of the first components which emit the electromagnetic or acoustic waves. Advantageously, the device and first components are incorporated in a Computer Assisted Surgery (CAS) System which includes the second components. Thus, the second components may interact with the first components, while the CAS system includes a plotting unit for determining the spatial coordinates of the body.

26 Claims, 3 Drawing Sheets

DEVICE FOR REFERENCING A SYSTEM OF COORDINATES

This application is a continuation of International Application No. PCT/CH97/00418, filed Nov. 4, 1997, the content of which is expressly incorporated herein by reference thereto.

FIELD OF THE INVENTION

The present invention relates generally to a device for referencing a system of coordinates for observing and locating a body in space, with respect to its position, shape, and/or alignment in the local field of gravity. Location and tracking of the body in space can be built into the device and may consist of at least two independent means for determining such, involving transmission or emission and, in a complementary way, detection or reception.

BACKGROUND OF THE INVENTION

In many instances, portable or mobile measuring devices or imaging devices are used whose position has to be changed, depending upon the measurement being taken. Some of these devices change their behavior depending upon their alignment to the field of gravitation of the earth, e.g., because of changes in the dimensions or shape of the materials used. This can result in incorrect measurements or erroneous images. An accurate measurement of the line of the field of gravity of the earth in relation to the alignment of the measuring device is necessary in order to correct or to compensate for these errors.

French Patent Application No. 2608271 to Thome discloses a device for determining the vector of the gravitational force. This well-known device contains a body made of lead on a thread that can move freely in the horizontal position and which is aligned in a field of gravity. Balls having pre-marked centers have been arranged along this thread in such a way that the alignment of the centers of the balls makes it possible to determine the vector of the gravitational force. However, this well-known device only makes it possible to determine a three-dimensional system of coordinates whose vertical axis is defined by the vector of the gravitational force.

U.S. Pat. No. 5,197,476 to Nowacki discloses a device for determining a stable three-dimensional system of coordinates. This well-known device includes a three-dimensional frame that is equipped with Infra Red LEDs (Light Emitting Diodes), two infrared cameras and a computer. The positions of the Infrared LEDs in space are detected by means of the infrared cameras and those positions are then stored in the computer. After the frame is removed, the device measures the position of an ultrasound probe that also is equipped with Infrared LEDs and that can be moved manually within the volume previously defined by the frame relative to the previously stored positions of the Infrared LEDs on the frame. Hence, this device is only able to determine a stable three-dimensional system of coordinates that has no relation at all to the vector of the gravitational force.

It is at this juncture that the present invention wishes to provide a remedy. The present invention addresses the problem of determining a vector aligned in a local field of gravity. This vector lies within a space, for example within the space of an operating room, that has objects that are aligned in space and in relation to a stable system of coordinates. By incorporating the device made in accordance with the present invention in a CAS System (Computer Assisted Surgery System) a system of reference coordinates for measuring objects in medical robotics or in computer assisted surgical navigation can be established with an axis that runs parallel to the gravitational force.

SUMMARY OF THE INVENTION

The present invention is directed to a device for referencing a system of coordinates (1) in space (2), using a body (4) suspended in space (2) and aligned in the local field of gravity (3), wherein the body (4) may comprise a first set of at least two means (5) that can be optically, acoustically, or electromagnetically active and that can be placed at a distance, A, from each other beforehand, and wherein the device can be incorporated in a Computer Assisted Surgery (CAS) System. This system comprises a second set of at least two additional means (5) that can be optically, acoustically, or electromagnetically effective and which may interact with the first set of means (5) and also a plotting unit (16) for determining the spatial coordinates of the body. Advantageously, the first set of means (5) can include transmitters that emit electromagnetic or acoustic waves, and the second set of means can include optical or acoustical sensors (13). In a preferred arrangement, the first set of means includes acoustical receivers, and the second set of means includes acoustical receivers.

The body (4) can be suspended (6) by a thread, a wire, or a chain. Alternatively, the body (4) can be suspended (6) by being mounted on gimbals (15) or by a ball-and-socket-joint. In a preferred embodiments, the body (4) can be suspended (6) in space by being embedded in an elastomer, especially in silicon rubber, more especially in foamed silicon rubber.

The alignment of the body (4) in the field of gravity (3) may be damped, especially in one or more of the following ways: by a water bath (7) that surrounds the body (4); by springs; electromagnetically; by means of friction; and/or by air or gas pressure shock absorbers.

In preferred embodiments, at least one set of means used may encompass one or more of the following: optical emitters, reflectors, or receivers; Light Emitting Diodes (LEDs); or Infrared LEDs. Preferably, when the first set of means used includes LEDs or Infrared LEDs, the second set of means used may include optical emitters, reflectors, or receivers.

Preferably, the second set of means may include one or more of at least two cameras, at least two optical sensors, or at least two acoustic sensors. When the cameras are not stabilized, their position can be determined by analyzing a stable control point field. When the cameras are stabilized, the position of the space coordinates can be determined videographically. Alternately, the stabilized cameras may be digital.

When the second set of means are cameras, the first set of means can include at least one transmitter of electromagnetic waves, such that the position of the space coordinates may be determined by the combination of equipment. When the second set of means are acoustical sensors, the first set of means can include sound wave emitters or reflectors, such that the position of the space coordinates may be determined by the combination of equipment. Optionally, in this case, the position of the space coordinates may be determined through analysis of interference effects. When the second set of means includes optical sensors, the first set of means can include light wave emitters or reflectors, such that the position of the space coordinates may be determined by the combination of equipment. Optionally, in this case, the position of the space coordinates may be determined through analysis of interference effects.

In another preferred embodiment, the first set of means may comprise at least one coil used to set up a magnetic field. Preferably, the second set of means can further comprise at least two coils or at least two echo sensors to detect the magnetic field. Optionally, in such cases, the position of the space coordinates may be determined through analysis of either the magnetic induction or the echo effect.

Additionally, the first set of means used may include acoustical transmitters or reflectors, preferably at least two, and the second set of means may include microphones. Optionally, in this case, the position of the space coordinates may be determined through analysis of interference effects.

DETAILED DESCRIPTION OF THE INVENTION

Figure 1:
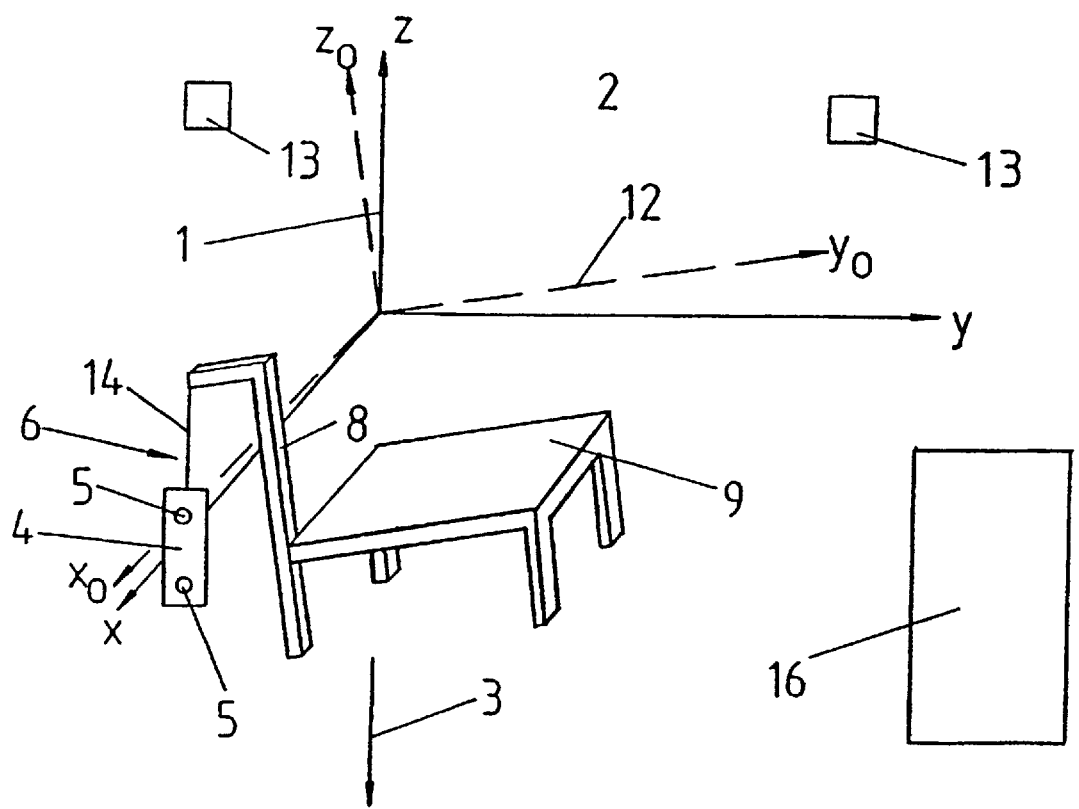
FIG. 1 is a presentation in perspective of the arrangement of the device made in accordance with the present invention that has a frame, a table, and a system of coordinates.

The device that is made in accordance with the present invention should make it possible to determine the deformation of bodies in space that results from gravitation. This can be done by determining beforehand the distortion in dimension or shape of the body that results from its position vis-à-vis the vector that is aligned in the local field of gravity.

The present invention resolves the problem that is posed by suspending in space a body that is aligned in a local field of gravity wherein the body (4) comprises a first set of at least two means (5) that are optically, electromagnetically, or acoustically active and that have been placed at a distance, A, from each other beforehand, and wherein the device is incorporated with a Computer Assisted Surgery (CAS) System, which comprises a second set of at least two additional means (5) that are optically, electromagnetically, or acoustically effective and which interact with the first set of means (5) and with a plotting unit (16) for determining the spatial coordinates of the first set of means (5).

The device made in accordance with the present invention can thus be mounted securely to a frame that allows it to swing freely and to align itself in the field of gravity by virtue of the distribution of its mass.

The position of the vector aligned with the field of gravity can be determined by Light Emitting Diodes (LEDs) that may be mounted on the device and with the aid of a sensor and a plotting unit that can be located in the operating room. Other transmitters or reflectors of electromagnetic waves or sound waves also can be used instead of, or in addition to, the LEDs. The determination of the position of the space coordinates may be achieved by using optical sensors or sound sensors, for example, such as microphones, that receive the electromagnetic waves or sound waves emitted and/or reflected by the two transmitters and/or reflectors provided on the body, in combination with an electronic plotting unit. If sound waves are used, the transmitters may also be placed somewhere in the room and the receivers placed on the device that is made according to the present invention. It also is possible to determine the position of the axes of the coordinates aligned in the gravitational field by means of coils that have been mounted on the device, in combination with other coils that also have been installed in the operating room, by measuring the magnetic induction and then by analyzing it with the plotting unit.

This provides the advantage of being able to determine within a room, for example, within an operating room, a system of coordinates, one of whose axes corresponds with the orientation of the local field of gravity. This system of coordinates can then serve as a reference system for determining the position, and recording the movements, of objects used in medical robotics, Computer Assisted Surgery (CAS) and Navigation, as well as during Imagery Guided Surgery and Navigation.

A preferred embodiment of the device made in accordance with the present invention consists of damping the vibrations, oscillations, perturbations, or other undesirable movements of the body aligned in the local field of gravity and suspended in space. Mechanical devices, such as springs or a water bath, may be used as damping instruments, or electromagnetic damping elements also may be used. These devices offer the advantage that any perturbation of the body is prevented or, at the very least, greatly inhibited and that vibrations have little or no effect on the alignment of the body.

A further preferred embodiment of the device made in accordance with the present invention consists of mounting the body on the frame on gimbals so that it can thus align itself in the local field of gravity. The frame may consist of, for example, an operating table, a case for holding medical instruments, or some other object in the operating room. Suspending the body on gimbals can make it possible to orient the body in space with at least two degrees of freedom, so that the body can always align itself with the field of gravity even when the frame has changed positions.

Still another embodiment of the device made in accordance with the present invention consists of equipping the device with at least two stable cameras and a plotting unit. This may make it possible to determine the position of the space coordinates of the system of coordinates by recording the electromagnetic waves emitted by the at least two transmitters or reflectors arranged on the body.

Still another embodiment of the device made in accordance with the present invention consists of outfitting the device with at least two cameras and a plotting unit, wherein the cameras can be used for recording the electromagnetic waves from the at least two transmitters or reflectors. In certain cases, the cameras are not arranged so as to be stable, and the gravitational vector can be determined by reference to another stationary body located in the room.

Yet another embodiment of the device made in accordance with the present invention consists of equipping the device with at least two stationary cameras and a plotting unit. The additional cameras may optionally be digital cameras.

A further embodiment of the device made in accordance with the present invention consists of equipping the device with at least two optical sensors. Here, these optical sensors can detect the electromagnetic waves emitted by the at least two transmitters or reflectors.

Another embodiment of the device made in accordance with the present invention consists of outfitting the device with at least two optical sensors that belong to a Computer Assisted Surgery (CAS) System. The two optical sensors and the plotting unit may aid in calculation of the position of the space coordinates of the system of coordinates by registering the electromagnetic waves emitted by the at least two transmitters or reflectors.

Another embodiment of the device made in accordance with the present invention consists of providing the device with at least two stationary acoustic sensors. These acoustic sensors can then detect the sound waves that are emitted by the at least two transmitters.

Again, still another embodiment of the device made in accordance with the present invention includes at least two stationary acoustic transmitters. Receivers that may be provided on the device made in accordance with the present invention can then detect the sound waves emitted by these at least two transmitters.

An additional embodiment of the device made in accordance with the present invention consists of arranging one set of means for detecting acoustic waves at a distance, A, from each other on the body that is aligned in the local field of gravity. These means may optionally be microphones.

Again, another embodiment of the device made in accordance with the present invention consists of equipping the device with at least two transmitters of sound waves. The sound waves that are emitted by the at least two transmitters can be detected by, for example, microphones on the device made in accordance with the present invention. In this way, the position of the space coordinates of the system of coordinates can be determined through analysis of their interference effects.

A further embodiment of the device in accordance with the present invention consists of outfitting the device with at least two acoustic transmitters that belong to a Computer Assisted Surgery (CAS) System. With the aid of the microphones and the plotting unit that belongs to the Computer Assisted Surgery System, the position of the space coordinates of the system of coordinates may be determined by the microphones registering the sound waves emitted by the at least two transmitters.

Another embodiment of the device made in accordance with the present invention consists of providing the body which is aligned in the local field of gravity with one set of means, placed at a distance, A, from each other, for detecting a magnetic field. This second set of means can be coils.

Still another embodiment of the device made in accordance with the present invention consists of providing the device with at least one coil that sets up a magnetic field. The at least two coils on the device, representing the second set of means, in accordance with the present invention, can detect the magnetic field established in this way, and may aid in determining the position of the space coordinates of the system of coordinates through analysis of the magnetic induction.

Still another embodiment of the device made in accordance with the present invention consists of providing the device with at least one coil, belonging to a Computer Assisted Surgery (CAS) System, that sets up a magnetic field. The at least two coils on the device, made in accordance with the present invention, along with the plotting unit, may then aid in detecting the position of the space coordinates of the system of coordinates by registering this magnetic field.

The advantage of the device that is made in accordance with the present invention lies in the fact that an already existing CAS system can be outfitted with a constant reference system of coordinates by a relatively simple improvement or enhancement of the system at minimal industrial expense. The present invention and the improvements thereto can be envisioned in greater detail by referencing partially diagrammatic illustrations of several examples of embodiments, shown as FIGS. 1–4.

FIG. 1 shows one type of embodiment of the body (4) aligned in the field of gravity (3) and belonging to the device made in accordance with the present invention, along with a frame (8) and at least two transmitters (5) that radiate light waves. In this embodiment the body (4) is suspended (6) by means of a wire (14) that is securely attached to a frame (8). This frame (8) in turn is attached to an operating table (9) or to other objects that are found in the operating room. At least two optical sensors (13) that are connected with a CAS System (16) detect the light waves that are emitted by the at least two transmitters (5).

The signals that are received by the optical sensors (13) may be processed in a computer system (16) by interferometry or videographically, and they can be represented as a system of coordinates (1) in space (2) with an axis that is parallel to the force of gravity. This system of coordinates (1) may be used as a reference system for making measurements using medical robotics technology or in computer assisted surgery and navigation. It does not absolutely have to have axes that are parallel to a system of coordinates (12) aligned with an operating table.

Figure 2:
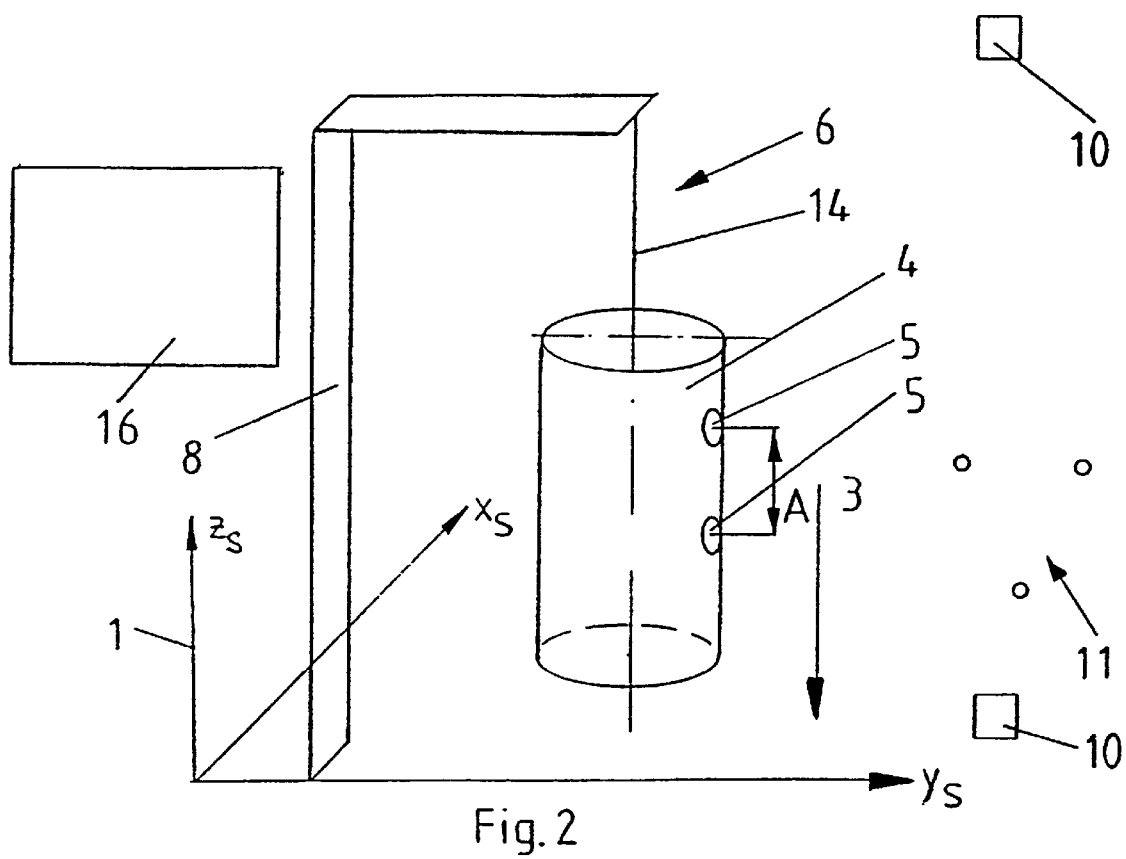
FIG. 2 is a presentation in perspective of one embodiment of the device made in accordance with the present invention.

FIG. 2 represents an embodiment of the body (4) in accordance with the present invention with the securely attached light sources (5) at a distance, A, from each other. This body (4) is suspended on a frame (8) by means of a wire (14) in such a way that it can be aligned in the local field of gravity (3). Two cameras (10) that are connected with a CAS System (16) detect the light waves that are emitted by the two transmitters (5). The signals that are received by the cameras (10) may be processed in a computer system (16) using videographs and may be represented as a system of coordinates (1) in space (2) with an axis that runs parallel to the force of gravity. This system of coordinates (1) can serve as a reference system for taking measurements in medical robotics or in computer assisted surgery and navigation.

Figure 3:
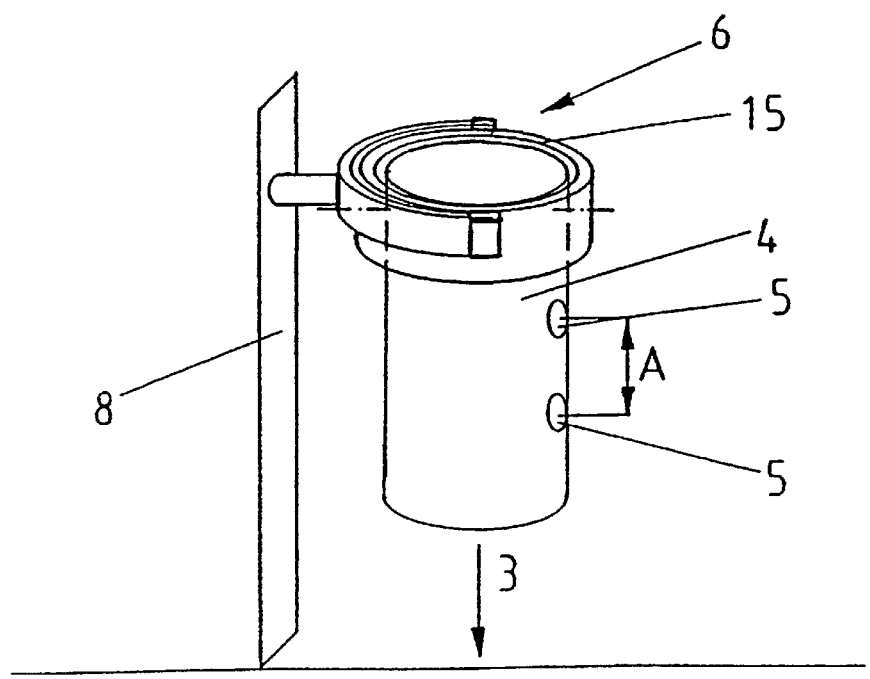
FIG. 3 is a presentation in perspective of an additional embodiment of the device made in accordance with the present invention.

The embodiment that is illustrated in FIG. 3 of the device made in accordance with the present invention is different from the embodiment that is shown in FIG. 1 and FIG. 2, only to the extent that its design is such that the body (4) is now suspended by means of freely swinging gimbals (15) that have been mounted on the frame (8) and can thus align itself in the direction of the local field of gravity (3).

Figure 4:
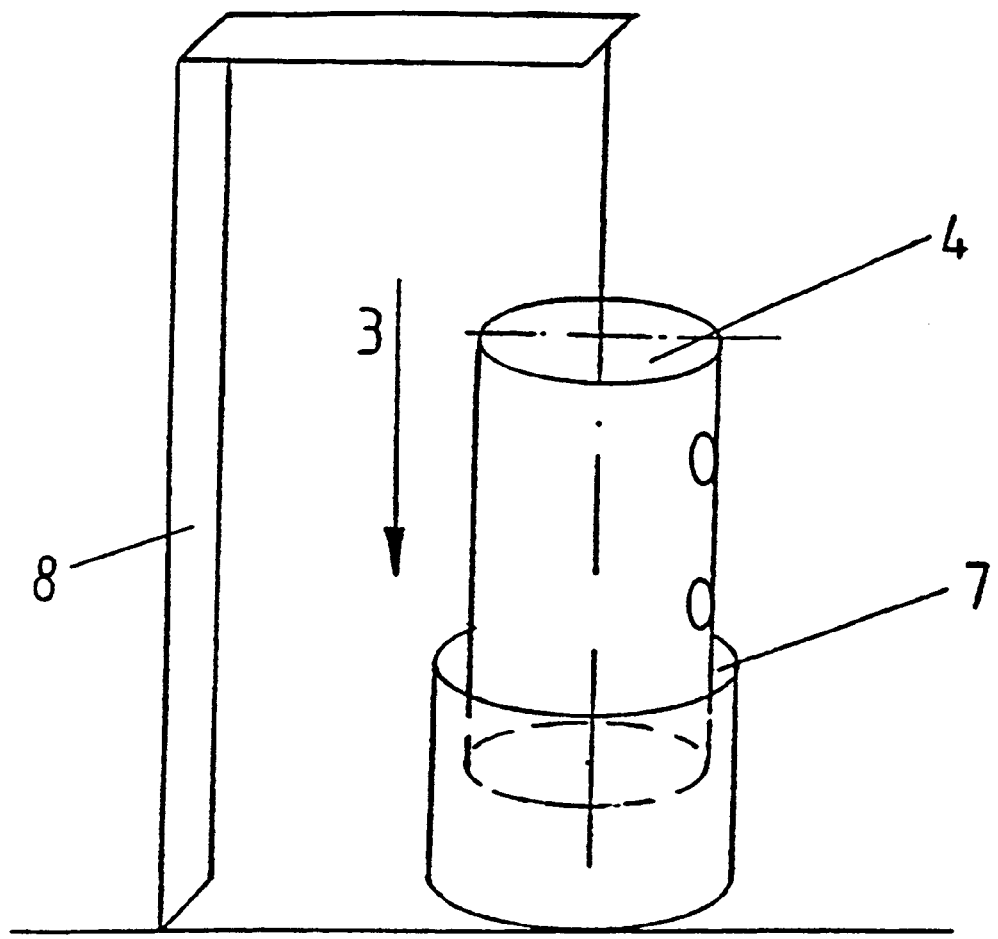
FIG. 4 is a presentation in perspective of still another embodiment of the device made in accordance with the present invention.

The embodiment that is shown in FIG. 4 differs from the embodiment that is shown in FIG. 1 and FIG. 2 of the device made in accordance with the present invention, only because the body (4) is partially immersed in a liquid bath (7) and, as a consequence, its vibrations can be damped.

What is claimed is:

1. A Computer Assisted Surgery (CAS) System that includes a device incorporated therein for referencing a system of coordinates in space, using a body suspended in space and aligned in a local gravitational field, wherein the body comprises a first set of at least two means that are optically, acoustically, or electromagnetically active and that have been placed at a distance, A, from each other beforehand; and wherein the system further comprises:

a second set of at least two additional means that are optically, acoustically, or electromagnetically active and which interact with the first set of means; and a plotting unit for determining the spatial coordinates of the body.

2. The system of claim 1, wherein the first set of means includes transmitters that emit electromagnetic or acoustic waves, and the second set of means includes optical or acoustical sensors.

3. The system of claim 1, wherein the first set of means includes acoustical receivers, and the second set of means includes acoustical transmitters.

4. The system of claim 1, wherein the body is suspended by a thread, a wire, or a chain.

5. The system of claim 1, wherein the body is suspended by gimbals.

6. The system of claim 1, wherein the body is suspended by a ball-and-socket-joint.

7. The system of claim 1, wherein the body is suspended by being embedded in an elastomer.

8. The system of claim 7, wherein the elastomer is a silicon rubber or a foamed silicon rubber.

9. The system of claim 1, wherein the alignment of the body in the gravitational field is mechanically or electromagnetically damped.

10. The system of claim 9, wherein the alignment of the body in the gravitational field is damped by a water bath that surrounds the body, by springs, or by pneumatic shock absorbers.

11. The system of claim 2, wherein at least one set of means used includes optical emitters, reflectors, or receivers; Light Emitting Diodes (LEDs); or Infrared LEDs.

12. The system of claim 2, wherein the first set of means includes Light Emitting Diodes (LEDs) or Infrared LEDs and the second set of means includes optical emitters, reflectors, or receivers.

13. The system of claim 2, wherein the second set of means comprises at least two cameras, optical sensors, or acoustic sensors.

14. The system of claim 13, wherein the second set of means comprises two cameras having a position that is determined by recording and analyzing a stable control point field.

15. The system of claim 13, wherein the first set of means comprises at least one transmitter of electromagnetic waves and the second set of means comprises two cameras for detecting the electromagnetic waves emitted or reflected by the at least one transmitter to aid in determining the position of space coordinates of the system of coordinates.

16. The system of claim 13, wherein the second set of means comprises two stabilized cameras for videographically determining the position of space coordinates of the system of coordinates.

17. The system of claim 16, wherein the cameras are stabilized digital cameras.

18. The system of claim 13, wherein the first set of means comprises sound wave emitters or reflectors and the second set of means comprises acoustical sensors that detect the sound waves emitted or reflected by the first set of means to aid in determining the position of space coordinates of the system of coordinates.

19. The system of claim 18, wherein the position of the space coordinates of the system of coordinates is determined through analysis of interference effects.

20. The system of claim 13, wherein the first set of means comprises light wave emitters or reflectors and the second set of means comprises optical sensors that detect the light waves emitted or reflected by the first set of means to aid in determining the position of space coordinates of the system of coordinates.

21. The system of claim 20, wherein the position of the space coordinates of the system of coordinates is determined through analysis of interference effects.

22. The system of claim 2, wherein the first set of means comprises at least one coil used to set up a magnetic field.

23. The system of claim 22, wherein the second set of means comprises at least two coils used to detect the magnetic field and that, together with the plotting unit, aid in determining the position of space coordinates of the system of coordinates through analysis of magnetic induction.

24. The system of claim 22, wherein the second set of means comprises at least two echo sensors used to detect the magnetic field and that, together with the plotting unit, aid in determining the position of space coordinates of the system of coordinates, through analysis of echo effects.

25. The system of claim 3, wherein the first set of means includes acoustical transmitters and the second set of means includes microphones.

26. The system of claim 3, wherein the first set of means comprises at least two acoustic transmitters or reflectors and the second set of means comprises microphones to detect the sound waves, such that the position of space coordinates of the system of coordinates is determined through analysis of interference effects.

* * * * *